(12) United States Patent
Takama et al.

(10) Patent No.: US 7,940,335 B2
(45) Date of Patent: May 10, 2011

(54) VIDEO SIGNAL OUTPUT CIRCUIT AND ELECTRONIC DEVICE USING THE SAME

(75) Inventors: Kinya Takama, Kyoto (JP); Daisuke Onishi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 1144 days.

(21) Appl. No.: 11/571,913

(22) PCT Filed: Jul. 4, 2005

(86) PCT No.: PCT/JP2005/012304
§ 371 (c)(1),
(2), (4) Date: Jan. 10, 2007

(87) PCT Pub. No.: WO2006/008945
PCT Pub. Date: Jan. 26, 2006

(65) Prior Publication Data
US 2008/0002057 A1      Jan. 3, 2008

(30) Foreign Application Priority Data

Jul. 23, 2004   (JP) ................................. 2004-215062

(51) Int. Cl.
*H04N 5/16*   (2006.01)
(52) U.S. Cl. ....................................... 348/691; 348/525
(58) Field of Classification Search .......... 348/521–535, 348/691–698, 689
See application file for complete search history.

(56) References Cited

U.S. PATENT DOCUMENTS

| | | | | |
|---|---|---|---|---|
| 3,819,859 A | * | 6/1974 | Borsuk et al. | 348/531 |
| 4,215,371 A | * | 7/1980 | Baggett et al. | 348/695 |
| 5,341,173 A | * | 8/1994 | Hyeon | 348/525 |
| 5,686,968 A | * | 11/1997 | Ujiie et al. | 348/521 |
| RE40,412 E | * | 7/2008 | Cooper | 348/525 |
| 2002/0140830 A1 | | 10/2002 | Shirakawa et al. | |

FOREIGN PATENT DOCUMENTS

| | | |
|---|---|---|
| JP | 2-53666 | 4/1990 |
| JP | 06-225181 | 8/1994 |
| JP | 08-172548 | 7/1996 |

\* cited by examiner

*Primary Examiner* — M. Lee
(74) *Attorney, Agent, or Firm* — Fish & Richardson P.C.

(57) ABSTRACT

A video signal output circuit includes a sync-tip clamp circuit fixing a sync-tip level of an input video signal at a constant voltage, a low-pass filter receiving the video signal output from the sync-tip clamp circuit and eliminating a predetermined high-frequency component, a dummy circuit receiving the video signal output from the sync-tip clamp circuit and outputting the video signal having substantially the same sync-tip level as that of the video signal output from the low-pass filter, and an output driver receiving the video signal output from the low-pass filter and outputting the video signal with a low output impedance. The sync-tip clamp circuit controls the sync-tip level of the video signal output from the dummy circuit such that the sync-tip level of the video signal is equal to a predetermined reference voltage.

3 Claims, 2 Drawing Sheets $V_{SC}$

VIDEO SIGNAL OUTPUT CIRCUIT AND ELECTRONIC DEVICE USING THE SAME

TECHNICAL FIELD

The present invention relates to a video signal output circuit having a sync-tip clamp circuit and a low-pass filter, and an electronic device using the video signal output circuit.

BACKGROUND ART

A video signal output circuit which outputs a video signal to a video signal output terminal and the like of an electronic device generally uses a sync-tip clamp circuit for fixing the level (sync-tip level) of the bottom (sync-tip) of a synchronous signal at a constant voltage $V_{SC}$, as in the waveform diagram shown in FIG. 3 (e.g., Japanese Patent Laying-Open No. 06-225181 (Patent Document 1)). Furthermore, in recent years, a video signal output circuit has also been developed which incorporates a low-pass filter and is capable of directly inputting a video signal output from a D/A converter to a video signal output terminal of an electronic device.

FIG. 4 is a circuit configuration diagram of a conventional video signal output circuit.

Referring to FIG. 4, in a conventional video signal output circuit 101, a coupling capacitor 102 eliminates a DC component of the video signal input to an input terminal IN, and outputs an AC component to a sync-tip clamp circuit 103 at the subsequent stage. Sync-tip clamp circuit 103 fixes the sync-tip level at a constant voltage and outputs the video signal to a low-pass filter 104 at the subsequent stage. Low-pass filter 104 eliminates unnecessary sampling noise and outputs the video signal to an output driver 106 such as a 75Ω driver at the subsequent stage. Output driver 106 outputs the video signal to an output terminal OUT with a low output impedance.

Low-pass filter 104 of video signal output circuit 101 is configured to use a differential amplifier 145. This prevents the sync-tip level of the video signal output from low-pass filter 104 from deviating from the sync-tip level of the video signal output from sync-tip clamp circuit 103. Therefore, low-pass filter 104 can almost maintain the sync-tip level of the video signal obtained by sync-tip clamp circuit 103. Accordingly, the input level of output driver 106 can be stabilized and the maximum output level (a maximum output peak-to-peak voltage) of the video signal to be output can be raised.

FIG. 5 is a detailed circuit diagram of low-pass filter 104. Differential amplifier 145 includes a pair of input transistors 201, 202, a pair of load transistors 203, 204, an input stage constant current source 205, an output transistor 206 and an output stage constant current source 207. The pair of input transistors 201, 202 is generally large in size so as to obtain a good pair characteristic.

Patent Document 1: Japanese Patent Laying-Open No. 06-225181

DISCLOSURE OF THE INVENTION

Problems to be Solved by the Invention

There is a need to improve the performance of the video signal output circuit, and particularly to raise the maximum output level of the video signal to be output. The present inventors paid attention to the fact that, in conventional low-pass filter 104, an offset voltage resulting from the difference between base currents flowing through the pair of input transistors 201, 202, and the like, results in a difference in the sync-tip level to some degree between an input video signal and an output video signal, to thereby reduce the maximum output level of the video signal output from output driver 106. They also paid attention to the fact that this maximum output level is further reduced when a plurality of low-pass filters 104 are connected in series to configure a high-order low-pass filter in order to obtain a precipitous low-pass characteristic.

Furthermore, the present inventors regard it as one approach to reduce the circuit scale of differential amplifier 145 configuring low-pass filter 104, in order to meet the request to reduce the cost of the video signal output circuit.

The present invention has been made in light of the above-described reasons, and an object of the present invention is to provide a video signal output circuit which is capable of raising the maximum output level of a video signal to be output and is small in circuit scale, and an electronic device using the video signal output circuit.

Means for Solving the Problems

In order to solve the above-described problems, the video signal output circuit according to the present invention includes a sync-tip clamp circuit fixing a sync-tip level of an input video signal at a constant voltage, a low-pass filter receiving the video signal output from the sync-tip clamp circuit and eliminating a predetermined high-frequency component, a dummy circuit receiving the video signal output from the sync-tip clamp circuit and outputting the video signal having substantially the same sync-tip level as that of the video signal output from the low-pass filter, and an output driver receiving the video signal output from the low-pass filter and outputting the video signal with a low output impedance. The sync-tip clamp circuit controls the sync-tip level of the video signal output from the dummy circuit such that the sync-tip level of the video signal is equal to a predetermined reference voltage.

Preferably, in the video signal output circuit, the low-pass filter includes a resistance element and a capacitive element, and the dummy circuit is configured in the same manner as the low-pass filter, except for the capacitive element included in the low-pass filter.

The electronic device according to the present invention includes a video signal output circuit and a video signal output terminal from which a video signal from the video signal output circuit is output. The video signal output circuit includes a sync-tip clamp circuit fixing a sync-tip level of an input video signal at a constant voltage, a low-pass filter receiving the video signal output from the sync-tip clamp circuit and eliminating a predetermined high-frequency component, a dummy circuit receiving the video signal output from the sync-tip clamp circuit and outputting the video signal having substantially the same sync-tip level as that of the video signal output from the low-pass filter, and an output driver receiving the video signal output from the low-pass filter and outputting the video signal with a low output impedance. The sync-tip clamp circuit controls the sync-tip level of the video signal output from the dummy circuit such that the sync-tip level of the video signal is equal to a predetermined reference voltage.

Effects of the Invention

The video signal output circuit according to the present invention can raise the maximum output level of the video signal output from the output driver and also reduce the circuit scale because the feedback control of the sync-tip level of the video signal output from the dummy circuit indirectly causes the sync-tip level of the video signal output from the low-pass filter to be equal to the predetermined reference voltage. In addition, the electronic device according to the present invention can raise the maximum output level of the video signal at the video signal output terminal, and thus can increase the dynamic range.

BRIEF DESCRIPTION OF THE DRAWINGS

A video signal output circuit which is a best mode for carrying out the present invention will be hereinafter described. As shown in FIG. 1, video signal output circuit 1 includes an input terminal IN to which a video signal such as a composite video signal output from a D/A converter (not shown) is input and an output terminal OUT from which the video signal is output with a low output impedance, and also includes, between these terminals, a coupling capacitor 2, a sync-tip clamp circuit 3, a low-pass filter 4, a dummy circuit 5 and an output driver 6 as described below. Connected to input terminal IN is one end of coupling capacitor 2 which eliminates a DC component of the video signal input to input terminal IN to allow an AC component to pass therethrough.

Figure 1:
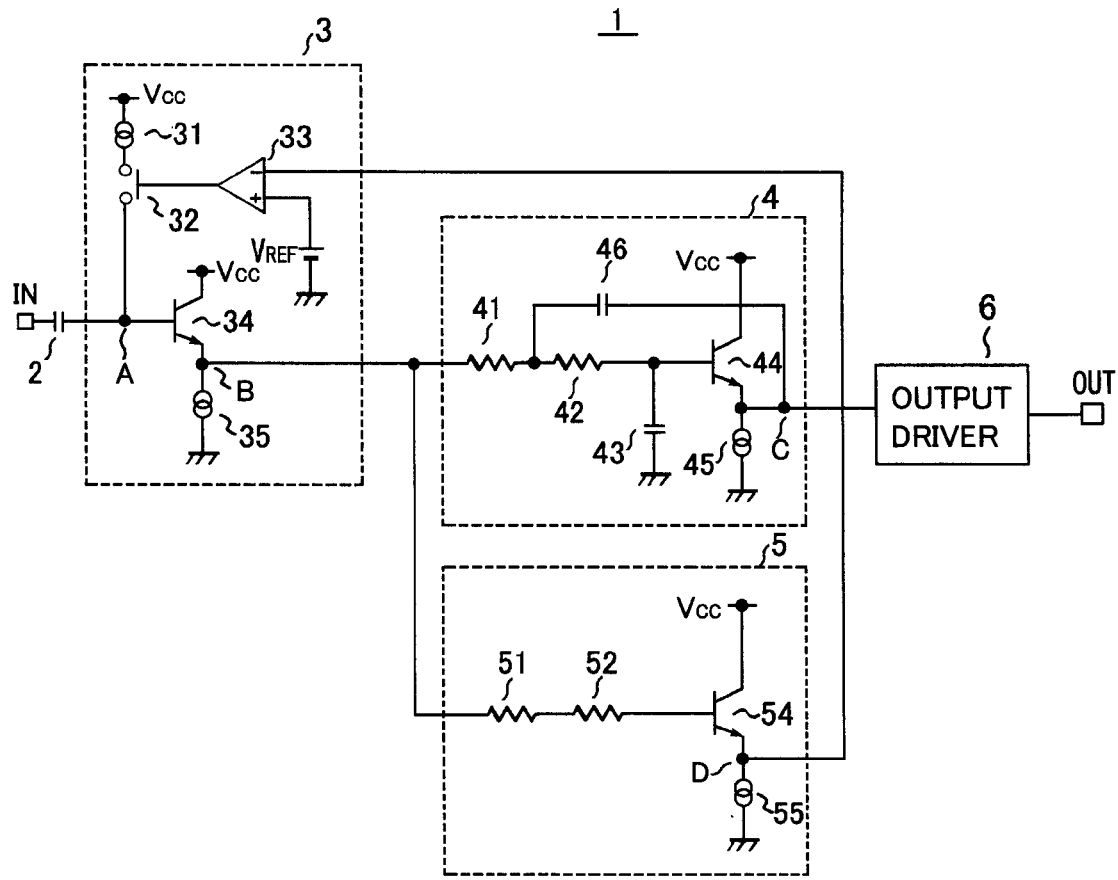
FIG. 1 is a circuit diagram of a video signal output circuit according to an embodiment of the present invention.

Sync-tip clamp circuit 3 is connected to the other end (a node A) of coupling capacitor 2. Sync-tip clamp circuit 3 fixes a sync-tip level of the input video signal at a constant voltage. Sync-tip clamp circuit 3 includes a constant current source 31 having one end connected to a power supply voltage $V_{CC}$ and the other end connected to a switch 32, switch 32 having one end connected to constant current source 31 and the other end connected to node A, turned on when a high level is input to a control end and turned off when a low level is input to the control end, a comparator 33 having an inversion input terminal to which the video signal output from dummy circuit 5 described below is feedback-input, having a non-inversion input terminal to which a predetermined reference voltage $V_{REF}$ is input and outputting a high-level or a low-level to the control end of switch 32, an NPN transistor 34 having the base connected to node A, the collector connected to power supply voltage $V_{CC}$ and the emitter connected to a constant current source 35, and constant current source 35 having one end connected to the emitter (a node B which is an output end of sync-tip clamp circuit 3) of transistor 34 and having the other end grounded.

Node B is connected to low-pass filter 4. Low-pass filter 4 receives the video signal output from sync-tip clamp circuit 3 to eliminate a predetermined high-frequency component. Low-pass filter 4 includes a resistor 41 having one end connected to node B, a resistor 42 having one end connected to the other end of resistor 41, a capacitor 43 having one end connected to the other end of resistor 42 and having the other end grounded, an NPN transistor 44 having the base connected to the other end of resistor 42 and the collector connected to power supply voltage $V_{CC}$, a constant current source 45 having one end connected to the emitter (a node C which is an output end of low-pass filter 4) of transistor 44 and having the other end grounded, and a capacitor 46 having ends connected respectively to the other end of resistor 41 and node C. The frequency of the predetermined high-frequency component to be eliminated is determined by the values of resistors 41, 42 and capacitors 43, 46. Furthermore, low-pass filter 4 is a secondary low-pass filter.

Node B is connected to dummy circuit 5. Dummy circuit 5 receives the video signal output from sync-tip clamp circuit 3 and outputs the video signal having substantially the same sync-tip level as that of the video signal output from low-pass filter 4. Dummy circuit 5 is configured as a circuit without capacitive elements of low-pass filter 4, that is, capacitors 43, 46. In other words, dummy circuit 5 includes a resistor 51 having one end connected to node B, a resistor 52 having one end connected to the other end of resistor 51, an NPN transistor 54 having the base connected to the other end of resistor 52 and the collector connected to power supply voltage $V_{CC}$, and a constant current source 55 having one end connected to the emitter (a node D which is an output end of dummy circuit 5) of transistor 54 and having the other end grounded.

Node C is connected to output driver 6. Output driver 6 receives the video signal output from low-pass filter 4 and outputs the video signal to output terminal OUT with a low output impedance. Output driver 6 is, for example, a 75Ω driver which drives 75Ω.

The operation of video signal output circuit 1 will then be described.

Since the video signal output from the D/A converter is input to input terminal IN, the waveforms of the video signals at node A and node B vary microscopically in a stepwise manner. That is, these video signals include high-frequency sampling noise forming the stepwise waveform. Low-pass filter 4 eliminates the high-frequency component to smooth the video signal and output it from node C to output driver 6. The sync-tip level of the video signal at node C then has a value shifted from the sync-tip level of the video signal at node B by a forward bias voltage (Vf) of transistor 44. Furthermore, the phase of the video signal at node C is shifted from the phase of the video signal at node B due to the low-pass characteristic.

The waveform of the video signal at node D is almost the same as the waveform of the video signal at node B and contains sampling noise. However, the sync-tip level of the video signal at node D has a value shifted from the sync-tip level of the video signal at node B by a forward bias voltage (Vf) of transistor 54. It should be noted that, although there is a difference of whether there is sampling noise or not, the sync-tip levels of the video signals at node C and node D are both deviated from the sync-tip level of the video signal at node B and substantially equal to each other. This is because low-pass filter 4 and dummy circuit 5 have the same circuit configuration except for the capacitive elements.

The operation of fixing the sync-tip level of the video signal at a constant voltage will then be described.

If the voltage at node D at some point in time is lower than reference voltage $V_{REF}$, a high-level is input from comparator 33 to switch 32 to turn on the switch, and coupling capacitor 2 is charged by a constant current of constant current source 31. This also causes the voltages at node A, node B, node C and node D to be increased. When the voltage at node D increases to reference voltage $V_{REF}$, a low-level is input from comparator 33 to switch 32 to turn off the switch. On the other hand, when the voltage at node D at some point in time is higher than the predetermined reference voltage $V_{REF}$, switch 32 is not turned on, and therefore, the voltage at node D does not change. Thus, since the lower voltage of the video signal becomes equal to reference voltage $V_{REF}$ at node D, the sync-tip level which is the minimum voltage of the video signal is feedback-controlled so as to be fixed at the voltage equal to reference voltage $V_{REF}$. Therefore, the sync-tip level of the video signal at node C will also be indirectly fixed at the voltage equal to reference voltage $V_{REF}$.

Thus, since the sync-tip level of the video signal output from low-pass filter 4 is fixed at the voltage equal to reference voltage $V_{REF}$, the input level of output driver 6 receiving the video signal can be stabilized and the maximum output level of the video signal to be output can be raised (e.g., the maximum output level can be raised to 2.6 V in the case where power supply voltage $V_{CC}$ is 3 V). The electronic device provided with the video signal output terminal outputting the video signal from video signal output circuit 1 can raise the maximum output level of the video signal at this video signal output terminal, and thus can increase the dynamic range.

In this case, no problem occurs even if there is a relatively large difference in the sync-tip levels between the video signal input to low-pass filter 4 and the video signal output therefrom. Therefore, low-pass filter 4 does not need to be configured using a differential amplifier, and thus can have the simple configuration as described above.

When comparing video signal output circuit 1 to video signal output circuit 101 as described in the Background Art section, the total number of the elements of low-pass filter 4 and dummy circuit 5 is less than that of low-pass filter 104. In addition, it is not necessary to use a transistor which is large in size such as differential input transistors 201, 202 in low-pass filter 4 and dummy circuit 5, and this allows cost reduction. Since the sync-tip level of the video signal output from low-pass filter 4 can be more accurately fixed as compared to video signal output circuit 101, it is also possible to further raise the maximum output level of the video signal output from output driver 6.

It should be noted that the video signal output from low-pass filter 4 is not input to sync-tip clamp circuit 3 in order that the sync-tip level of the video signal is directly feedback-controlled, because the shift of the phase of the video signal at node C from the phase of the video signal at node B results in defects such as oscillation.

Figure 2:
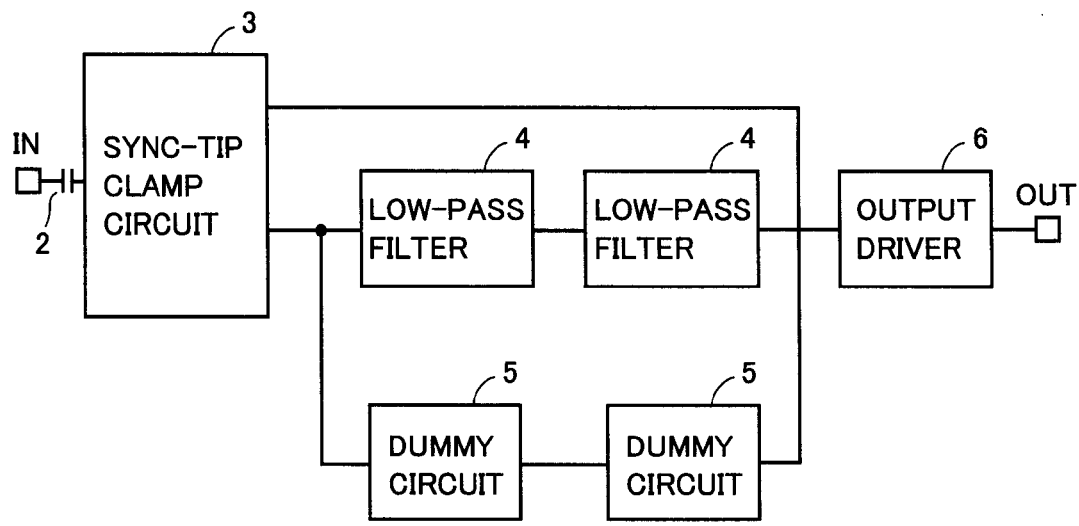
FIG. 2 is a block diagram of the video signal output circuit according to a modification of the embodiment of the present invention.
Figure 3:
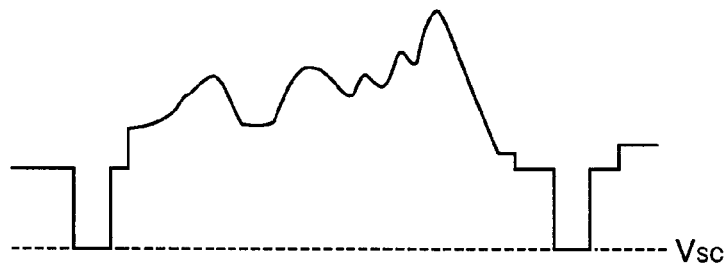
FIG. 3 shows a waveform diagram of a video signal of a conventional video signal output circuit.
Figure 4:
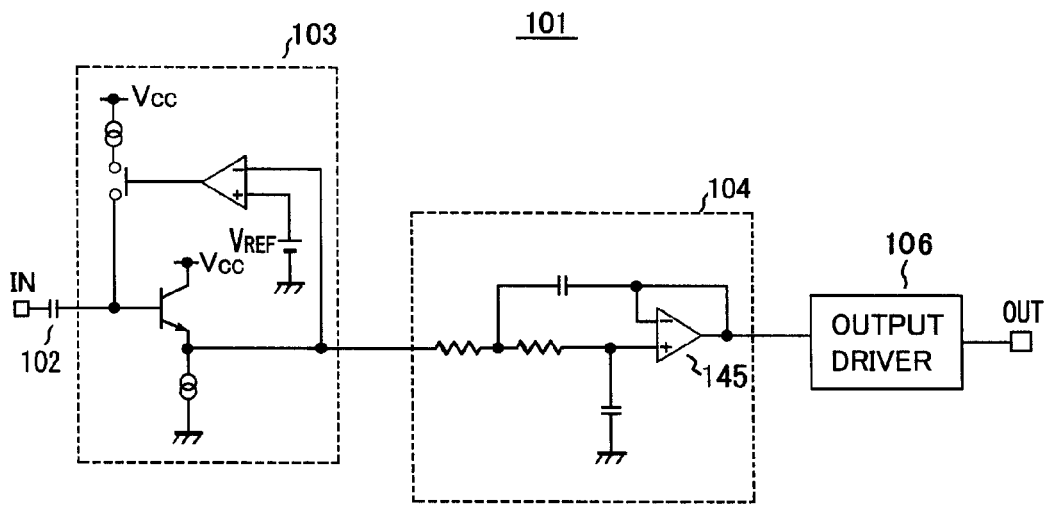
FIG. 4 is a circuit configuration diagram of the conventional video signal output circuit.
Figure 5:
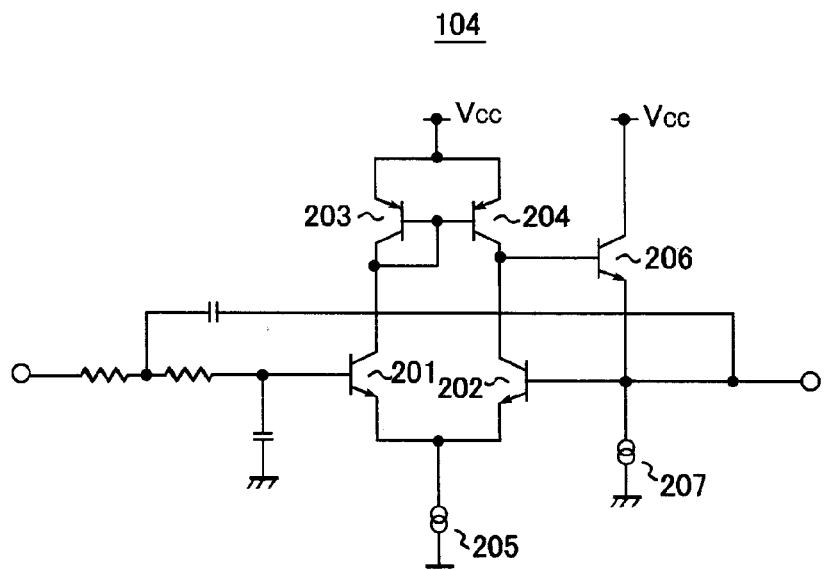
FIG. 5 is a detailed circuit diagram of a low-pass filter 104.
Description of the Reference Signs 1 video signal output circuit, 2 coupling capacitor, 3 sync-tip clamp circuit, 4 low-pass filter, 5 dummy circuit, 6 output driver, IN input terminal, OUT output terminal Best Modes for Carrying Out the Invention The embodiments of the present invention will be hereinafter described in detail with reference to the accompanying drawings, in which the same or corresponding components in each figure are designated by the same reference characters, and description thereof will not be repeated.

Although the video signal output circuit according to the embodiment of the present invention has been described as above, the present invention is not limited to the embodiment, but can be variously changed in its design within the range of the matters described in the claims. For example, if the sync-tip level of the video signal output from dummy circuit 5 is feedback-controlled, sync-tip clamp circuit 3 can also be configured in an arbitrary manner. In addition, although low-pass filter 4 in the above-described configuration allows the circuit scale to be reduced, low-pass filter 4 can also be configured in any manner without being limited to the configuration. Furthermore, although low-pass filter 4 is a secondary filter, it can also be a higher-order filter in order to obtain a further precipitous low-pass characteristic. For example, as shown in FIG. 2, a plurality of low-pass filters 4 can be connected in series and a plurality of dummy circuits 5 can also be connected in series. Output driver 6 may also be either type which outputs the video signal with or without amplification.

It should be understood that the embodiments disclosed herein are illustrative and non-restrictive in every respect. The scope of the present invention is defined by the claims, rather than the description above, and is intended to include any modifications within the scope and meaning equivalent to the claims.

What is claimed is:

1. A video signal output circuit comprising:
    a sync-tip clamp circuit fixing a sync-tip level of an input video signal at a constant voltage;
    a low-pass filter receiving the video signal output from the sync-tip clamp circuit and eliminating a predetermined high-frequency component;
    a dummy circuit receiving the video signal output from the sync-tip clamp circuit and outputting the video signal having substantially the same sync-tip level as that of the video signal output from the low-pass filter; and
    an output driver receiving the video signal output from the low-pass filter and outputting the video signal with a low output impedance, wherein
    said sync-tip clamp circuit controls the sync-tip level of the video signal output from said dummy circuit such that the sync-tip level of the video signal is equal to a predetermined reference voltage.

2. The video signal output circuit according to claim 1, wherein said low-pass filter includes a resistance element and a capacitive element, and
    said dummy circuit is configured in the same manner as said low-pass filter, except for the capacitive element included in said low-pass filter.

3. An electronic device comprising:
    a video signal output circuit, and
    a video signal output terminal from which a video signal from said video signal output circuit is output, wherein said video signal output circuit includes
    a sync-tip clamp circuit fixing a sync-tip level of an input video signal at a constant voltage,
    a low-pass filter receiving the video signal output from the sync-tip clamp circuit and eliminating a predetermined high-frequency component,
    a dummy circuit receiving the video signal output from the sync-tip clamp circuit and outputting the video signal having substantially the same sync-tip level as that of the video signal output from the low-pass filter, and
    an output driver receiving the video signal output from the low-pass filter and outputting the video signal with a low output impedance, wherein
    said sync-tip clamp circuit controls the sync-tip level of the video signal output from said dummy circuit such that the sync-tip level of the video signal is equal to a predetermined reference voltage.

* * * * *